Nov. 29, 1927.

A. PAYS 1,651,101

RECIPROCATING SAW MACHINE MORE PARTICULARLY FOR THE SAWING OF METALS

Filed May 31, 1923    2 Sheets-Sheet 1

Inventor
A. Pays
by Langner, Parry, Card & Langner
Attys.

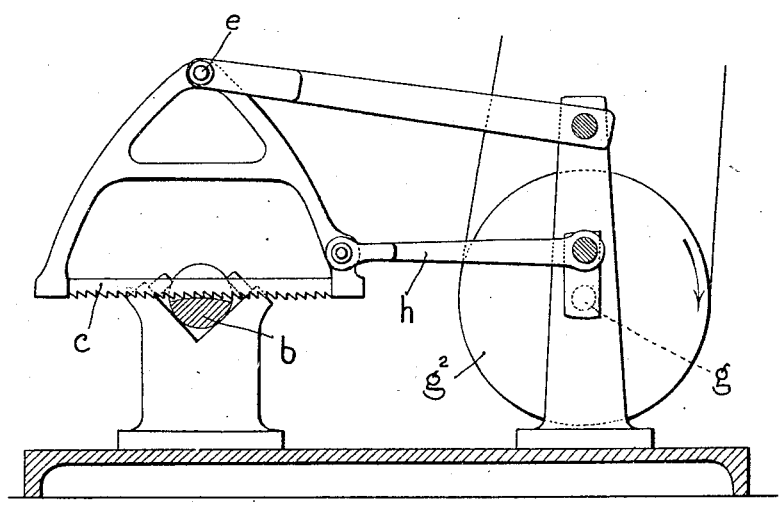

Patented Nov. 29, 1927.

1,651,101

UNITED STATES PATENT OFFICE.

ACHILLE PAYS, OF PARIS, FRANCE.

RECIPROCATING-SAW MACHINE MORE PARTICULARLY FOR THE SAWING OF METALS.

Application filed May 31, 1923, Serial No. 642,667, and in Belgium June 9, 1922.

The present invention has for its object a reciprocating-saw machine more particularly intended for the sawing of metal and allowing of arcuate cutting of the material to be sawn.

Arcuate cutting in spite of the undeniable advantages which it affords, is little employed in metal sawing because of the difficulties involved in giving to the saw a sufficiency of suitable movement by the aid of simple, strong and inexpensive parts.

The sawing machine according to this invention solves this problem in a particularly satisfactory manner. It is characterized in that the saw, which in the known manner during its working stroke is caused to bear upon the work and during its return stroke is separated therefrom, is arranged in a mounting which is guided in such a manner as to perform a reciprocating circular movement in the plane of the saw cut, thereby oscillating about a point situated on the side of the saw blade opposite to the work. In practice, this circular movement is obtained by causing the saw-mounting or frame to move in a circular slide having its convexity turned towards the work. This slide is mounted upon a support formed of two arms inclined to the vertical and freely movable about the axis of the crankshaft which, by the intermediary of a connecting rod, imparts to the saw its alternating motion. This arrangement permits the saw to remain in contact with the work during its operative stroke and to withdraw therefrom on the return stroke.

Two forms of construction of a sawing machine according to the present invention has been shown by way of example upon the annexed drawing which represents:—

Figure 1 a vertical elevation, in section on line 1—1 of Figure 2, of the sawing machine in its working position.

Figure 2, a front view corresponding with Figure 1, but having certain parts broken away and in section.

Figure 3, a diagram of the machine showing the saw at the highest point in its working stroke.

Fig. 5 is an elevation of a second form of the invention.

The machine is composed of a framework formed of a base $a$ and supports $a^1$ and $a^2$, the one set $a^1$ receiving the movable parts of the saw as well as the parts serving to actuate the latter, and the other support $a^2$ receiving the work, shown as a metal shaft $b$, to be sawn, which work is held in position by jaws or dogs $a^3$.

The straight saw blade $c$ is held or tensioned between arms $c^1$ connected by a crosspiece or backbone $c^2$ of circular or rounded shape having for its centre the point $e$ about which the saw is to perform its alternating circular movement. This cross piece or backbone $c^2$ is guided in a slide $f$ of corresponding shape which is fixed upon two arms $d$, inclined, and at their lower ends freely journaled upon the supports $a^1$ concentrically with a crankshaft $g$ also journaled in these supports. The crank-pin $g^1$ of this crankshaft is connected with the saw-frame or mounting by means of a connecting rod $h$. A pulley $g^2$ enables the shaft $g$ to be rotated.

Figure 1:
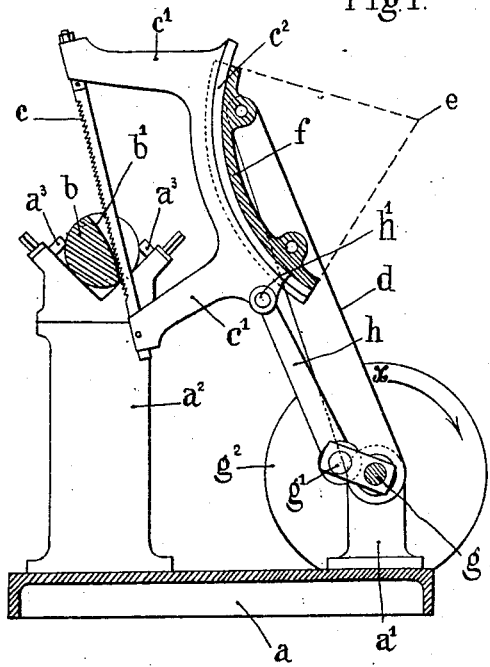
Figure 2:
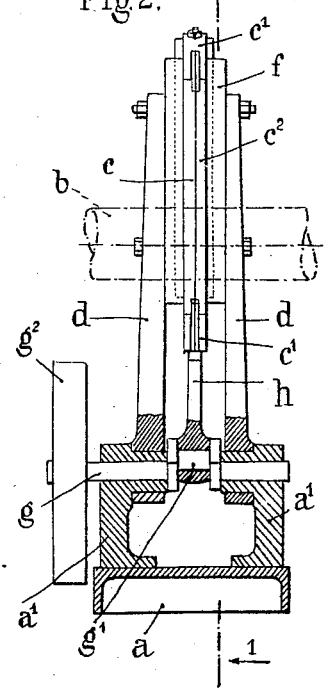
Figure 3:
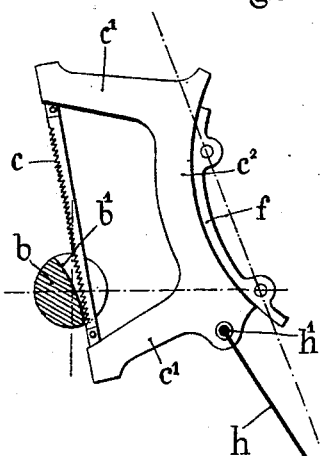
Figure 4:
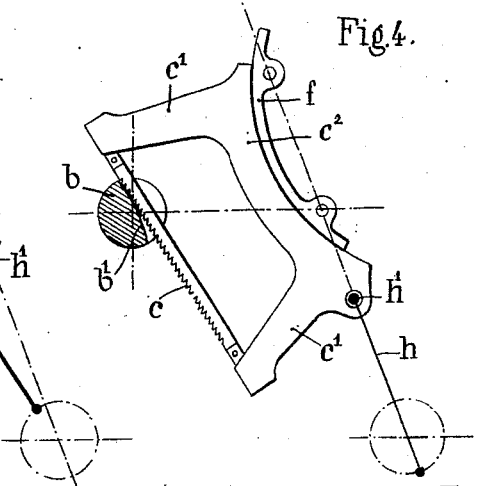
Figure 4 is a similar view, the saw being at the lowest part of its working stroke.

If it be supposed that the shaft $g$ is turning in the direction of the arrow $x$ and that the saw is in the position shown in Figure 3, that is to say at the commencement of its working stroke, the connecting rod $h$ exerts a pull which tends to apply the saw blade to the metal shaft or other work during the whole of the downward stroke; on the other hand, during the return stroke, this rod $h$ exerts a thrust which removes the blade from the shaft $b$.

Further, by turning or swinging about the centre $e$, the saw attacks the shaft $b$, at an angle which varies at each point in its stroke.

The result is that the line of the saw cut or kerf takes the shape of an arc $b^1$ which is the involute curve described by the saw blade while it moves along the shaft $b$ while still bearing upon this shaft.

The machine according to this invention enables the following advantages to be obtained compared with machines performing a straight cut:—

The saw blade attacks tangentially upon the arcuate surface of the cut, with a resulting rapid and regular work. This blade is well guided and the section obtained is distinctly even or level.

There will be at any moment only a small number of saw-teeth in engagement, the result being that the rapidity of the work is increased, although the saw bears only with a moderate pressure upon the shaft (or work) to be sawn.

In every position of the saw, the parings or waste from the cut become easily disengaged, heating is inconsiderable, and the work can be done dry.

Obviously the invention is not limited to the form of carrying it into effect which has been described, which indeed has only been given by way of example. Thus, the machine might include several parallel blades arranged upon the same mounting or frame; the alternating circular movement of the mounting might be obtained by a mechanism other than a circular slide, for example, by pivoting the mounting about the point $e$ which would be connected directly in that case to the axis of oscillation of the arms $d$, all as shown in Fig. 5.

What I claim is:

1. A saw machine, allowing arcuate cutting of work to be sawn, comprising, a frame, a work holder on the frame, a carrier pivotally connected to the frame, a rectilinear blade, a blade holder receiving the blade and adapted to rock about an axis which has an unvariable position relatively to said carrier, and means for imparting a rocking movement to said blade holder about the said axis, a circular slide, the curvature center of which is the rocking point of the blade holder, said slide being connected to the carrier and having its convexity turned towards the work to be sawn, said slide being adapted to guide the blade holder during its rocking movement.

2. A saw machine, allowing arcuate cutting of work to be sawn, comprising, a frame, a work holder on the frame, a carrier pivotally connected to the frame, a rectilinear blade, a blade holder receiving the blade and adapted to rock about an axis which has an unvariable position relatively to said carrier, and means for imparting a rocking movement to said blade holder about the said axis, a circular guide having its center about the rocking axis of the blade holder, said circular guide being connected to the carrier and being adapted to guide the blade holder during its rocking movement.

3. A saw machine, allowing arcuate cutting of work to be sawn, comprising, a frame, a work holder on the frame, a carrier pivotally connected to the frame, a rectilinear blade, a blade holder receiving the blade and adapted to rock about an axis which has an unvariable position relatively to said carrier, and means for imparting a rocking movement to said blade holder about the said axis.

4. A saw machine, allowing arcuate cutting of the work to be sawn, comprising, a frame, a work holder on the frame, a rectilinear blade, a circular guide having its convexity turned towards the work to be sawn, a blade holder guided upon said circular guide, a rotary crankshaft, a connecting rod connecting a crankpin thereof to the blade holder and adapted to impart to the same a reciprocating movement and a carrier freely pivoted about the frame and carrying the circular guide.

5. A saw machine, allowing arcuate cutting of work to be sawn, comprising, a frame, a work holder on the frame, a carrier pivotally connected to the frame, a rectilinear blade, a blade holder receiving the blade and adapted to rock about an axis which has an unvariable position relatively to said carrier, and means for imparting a rocking movement to said blade holder about the said axis and a rocking movement to the carrier relatively to the frame.

6. A saw machine, allowing arcuate cutting of work to be sawn, comprising, a frame, a work holder on the frame, a carrier pivotally connected to the frame, a rectilinear blade, a blade holder receiving the blade and adapted to rock about an axis which has an unvariable position relatively to said carrier, a rotary crankshaft, a connecting rod connecting a crankpin thereof to the blade holder and adapted to impart to the same a reciprocating movement about the said axis and to the carrier a rocking movement relatively to the frame.

In testimony whereof I have signed my name to this specification.

ACHILLE PAYS.